United States Patent
Krishna Murthy et al.

(10) Patent No.: US 10,782,997 B1
(45) Date of Patent: Sep. 22, 2020

(54) STORAGE MANAGEMENT SYSTEM AND METHOD

(71) Applicant: EMC IP Holding Company, LLC, Hopkinton, MA (US)

(72) Inventors: Sathya Krishna Murthy, Morrisville, NC (US); Alan L. Taylor, Cary, NC (US); Nagasimha G. Haravu, Apex, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 105 days.

(21) Appl. No.: 15/799,259

(22) Filed: Oct. 31, 2017

(51) Int. Cl.
*G06F 9/46* (2006.01)
*G06F 3/06* (2006.01)
*G06F 9/52* (2006.01)
*G06F 11/20* (2006.01)

(52) U.S. Cl.
CPC .............. *G06F 9/46* (2013.01); *G06F 3/0614* (2013.01); *G06F 9/526* (2013.01); *G06F 3/0601* (2013.01); *G06F 11/2069* (2013.01); *G06F 11/2087* (2013.01); *G06F 2003/0691* (2013.01); *G06F 2211/1095* (2013.01)

(58) Field of Classification Search
CPC ............ G06F 11/1469; G06F 11/1417; G06F 9/45537; G06F 3/0605; G06F 13/1663; G06F 17/24; G06F 11/2058; G06F 9/5083; G06F 11/28; G06F 9/52; G06F 9/526; G06F 2211/1085; G06F 2211/1095; G06F 3/0614; G06F 3/0601; G06F 11/2069; G06F 11/2087; G06F 2003/0691; G06F 9/46

See application file for complete search history.

(56) References Cited

U.S. PATENT DOCUMENTS

| | | | | |
|---|---|---|---|---|
| 4,398,264 A | * | 8/1983 | Couper | G06F 17/24 715/201 |
| 7,386,662 B1 | * | 6/2008 | Kekre | G06F 3/0605 711/113 |
| 7,873,963 B1 | * | 1/2011 | Fair | G06F 9/50 711/100 |
| 2005/0154847 A1 | * | 7/2005 | Trembecki | G06F 11/2058 711/162 |
| 2014/0372384 A1 | * | 12/2014 | Long | G06F 11/1469 707/679 |
| 2015/0007171 A1 | * | 1/2015 | Blake | G06F 9/45537 718/1 |
| 2016/0019117 A1 | * | 1/2016 | Kumarasamy | G06F 11/1417 707/650 |
| 2016/0253216 A1 | * | 9/2016 | Greenberger | G06F 9/5083 718/103 |
| 2018/0285254 A1 | * | 10/2018 | Baum | G06F 13/1663 |

* cited by examiner

*Primary Examiner* — Tuan A Vu
(74) *Attorney, Agent, or Firm* — Brian J. Colandreo; Mark H. Whittenberger; Holland & Knight LLP

(57) ABSTRACT

A method, computer program product, and computing system for receiving an control plane request on a layered services architecture that includes a plurality of discrete services and a rules engine. The control plane request is processed with the rules engine to identify one or more mandatory services, chosen from the plurality of discrete services, required to process the control plane request. The one or more mandatory services are sequenced to form a services workflow. The control plane request is processed based upon the services workflow.

18 Claims, 7 Drawing Sheets

STORAGE MANAGEMENT SYSTEM AND METHOD

TECHNICAL FIELD

This disclosure relates to storage systems and, more particularly, to high-availability storage systems.

BACKGROUND

As high-availability storage systems become more and more complex, they become more capable of performing more complex tasks. Unfortunately, as these tasks become more complex, the ability to execute such complex tasks becomes increasing complex too. For example, each of the complex tasks performed on a high-availability storage system may require that these individual tasks be specifically programmed. Accordingly and as would be expected, as the number of complex tasks being performed on these high-availability storage systems increases, the programming of these complex tasks can become overwhelming.

SUMMARY OF DISCLOSURE

In one implementation, a computer-implemented method is executed on a computing device and includes receiving a control plane request on a layered services architecture that includes a plurality of discrete services and a rules engine. The control plane request is processed with the rules engine to identify one or more mandatory services, chosen from the plurality of discrete services, required to process the control plane request. The one or more mandatory services are sequenced to form a services workflow. The control plane request is processed based upon the services workflow.

One or more of the following features may be included. The plurality of discrete services may include a navigator service that is configured to direct the control plane request to a plurality of data targets. The plurality of discrete services may include a transit service that is configured to provide data to a remote data target. The plurality of discrete services may include a copier service that is configured to make a copy of data for a remote data target. The plurality of discrete services may include a zero detect service that is configured to detect the absence of data within a data object being copied. The plurality of discrete services may include an IO coordinator service that is configured to arbitrate IO conflicts when processing the control plane request. The plurality of discrete services may include an IO target service that is configured to receive the control plane request.

In another implementation, a computer program product resides on a computer readable medium and has a plurality of instructions stored on it. When executed by a processor, the instructions cause the processor to perform operations including receiving a control plane request on a layered services architecture that includes a plurality of discrete services and a rules engine. The control plane request is processed with the rules engine to identify one or more mandatory services, chosen from the plurality of discrete services, required to process the control plane request. The one or more mandatory services are sequenced to form a services workflow. The control plane request is processed based upon the services workflow.

One or more of the following features may be included. The plurality of discrete services may include a navigator service that is configured to direct the control plane request to a plurality of data targets. The plurality of discrete services may include a transit service that is configured to provide data to a remote data target. The plurality of discrete services may include a copier service that is configured to make a copy of data for a remote data target. The plurality of discrete services may include a zero detect service that is configured to detect the absence of data within a data object being copied. The plurality of discrete services may include an IO coordinator service that is configured to arbitrate IO conflicts when processing the control plane request. The plurality of discrete services may include an IO target service that is configured to receive the control plane request.

In another implementation, a computing system including a processor and memory is configured to perform operations including receiving a control plane request on a layered services architecture that includes a plurality of discrete services and a rules engine. The control plane request is processed with the rules engine to identify one or more mandatory services, chosen from the plurality of discrete services, required to process the control plane request. The one or more mandatory services are sequenced to form a services workflow. The control plane request is processed based upon the services workflow.

One or more of the following features may be included. The plurality of discrete services may include a navigator service that is configured to direct the control plane request to a plurality of data targets. The plurality of discrete services may include a transit service that is configured to provide data to a remote data target. The plurality of discrete services may include a copier service that is configured to make a copy of data for a remote data target. The plurality of discrete services may include a zero detect service that is configured to detect the absence of data within a data object being copied. The plurality of discrete services may include an IO coordinator service that is configured to arbitrate IO conflicts when processing the control plane request. The plurality of discrete services may include an IO target service that is configured to receive the control plane request.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
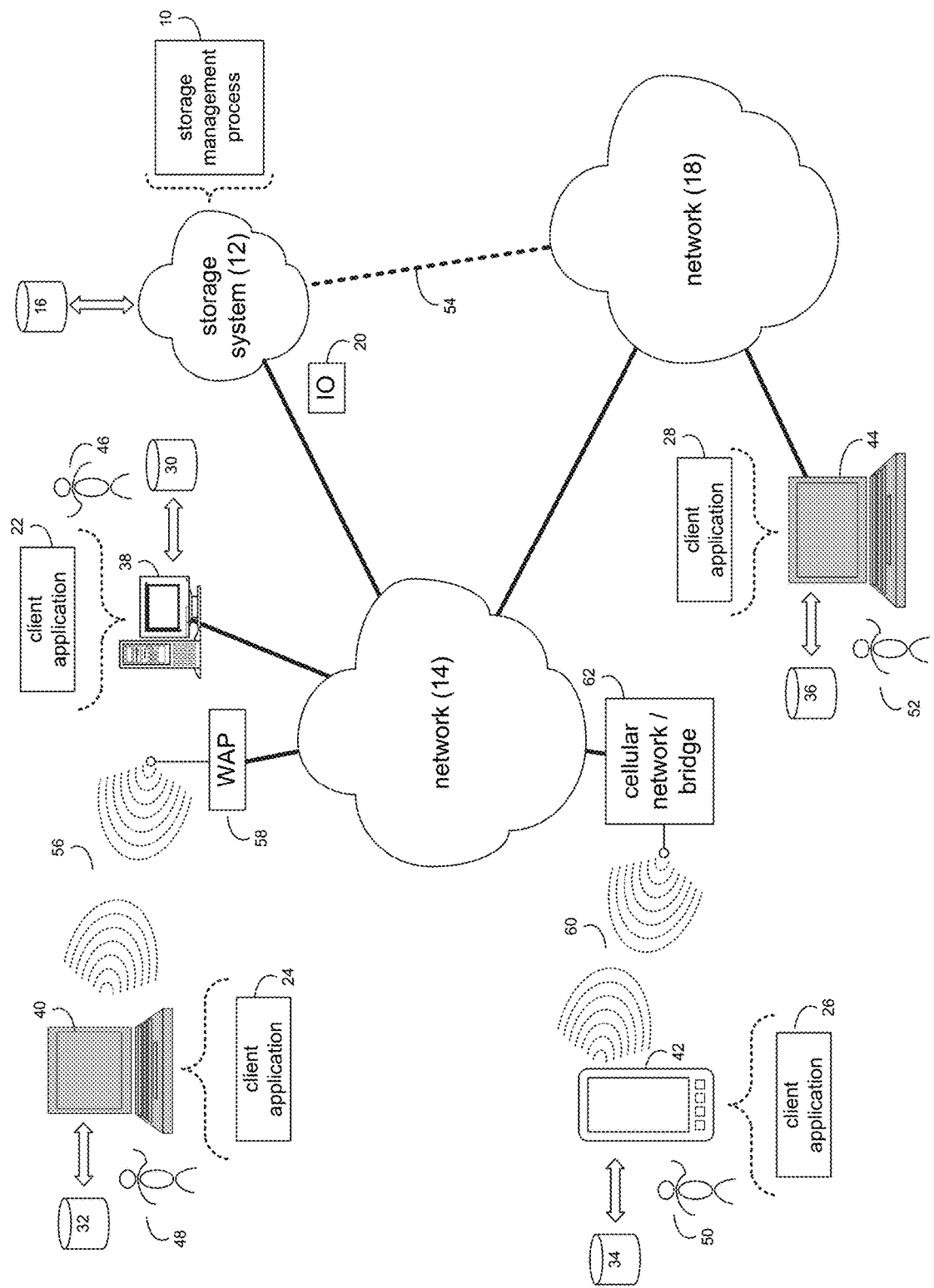
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
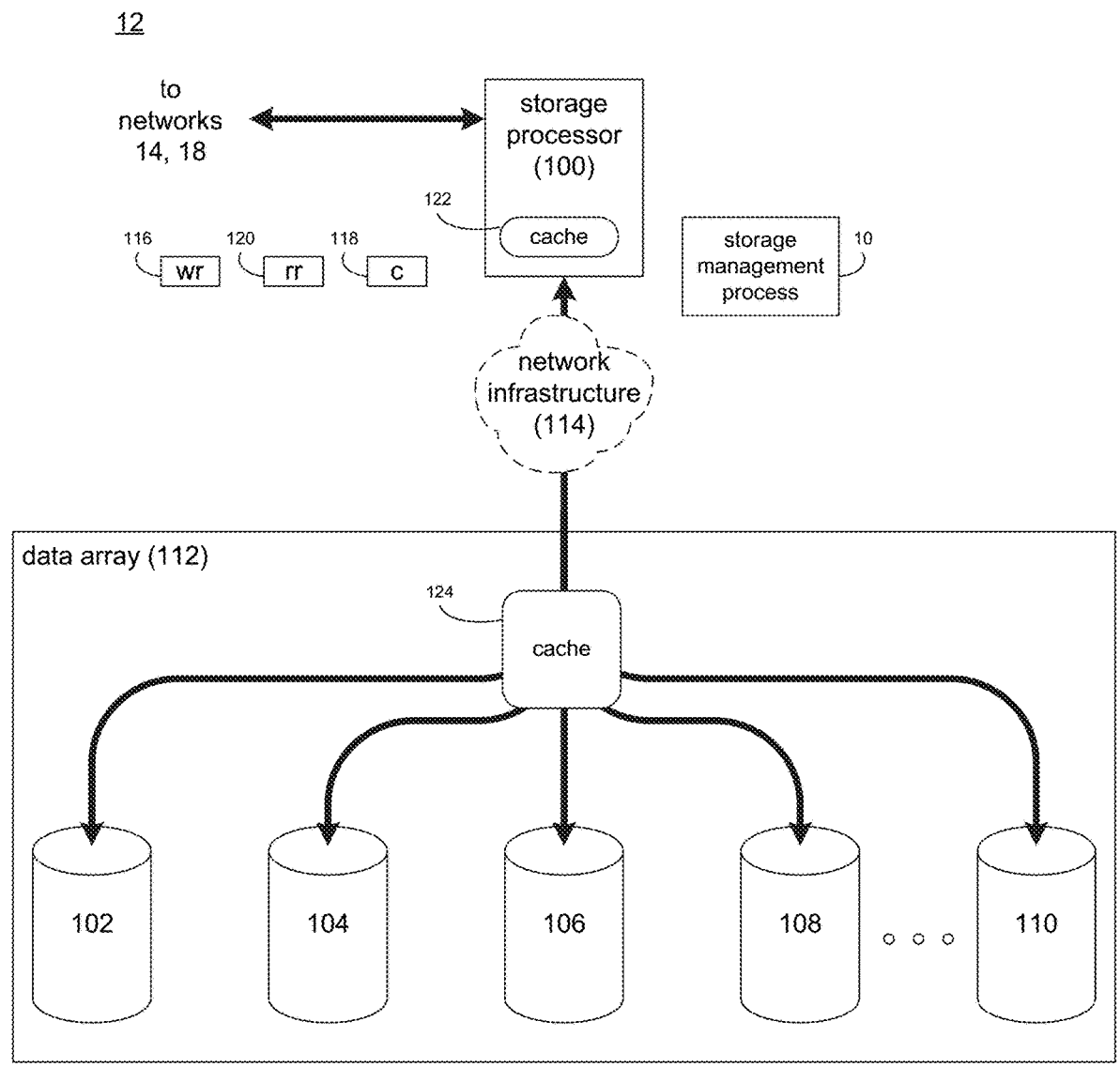
FIG. 2 is a diagrammatic view of the storage system of FIG. 1.

Storage System:

Referring also to FIG. 2, there is shown a general implementation of storage system 12. In this general implementation, storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
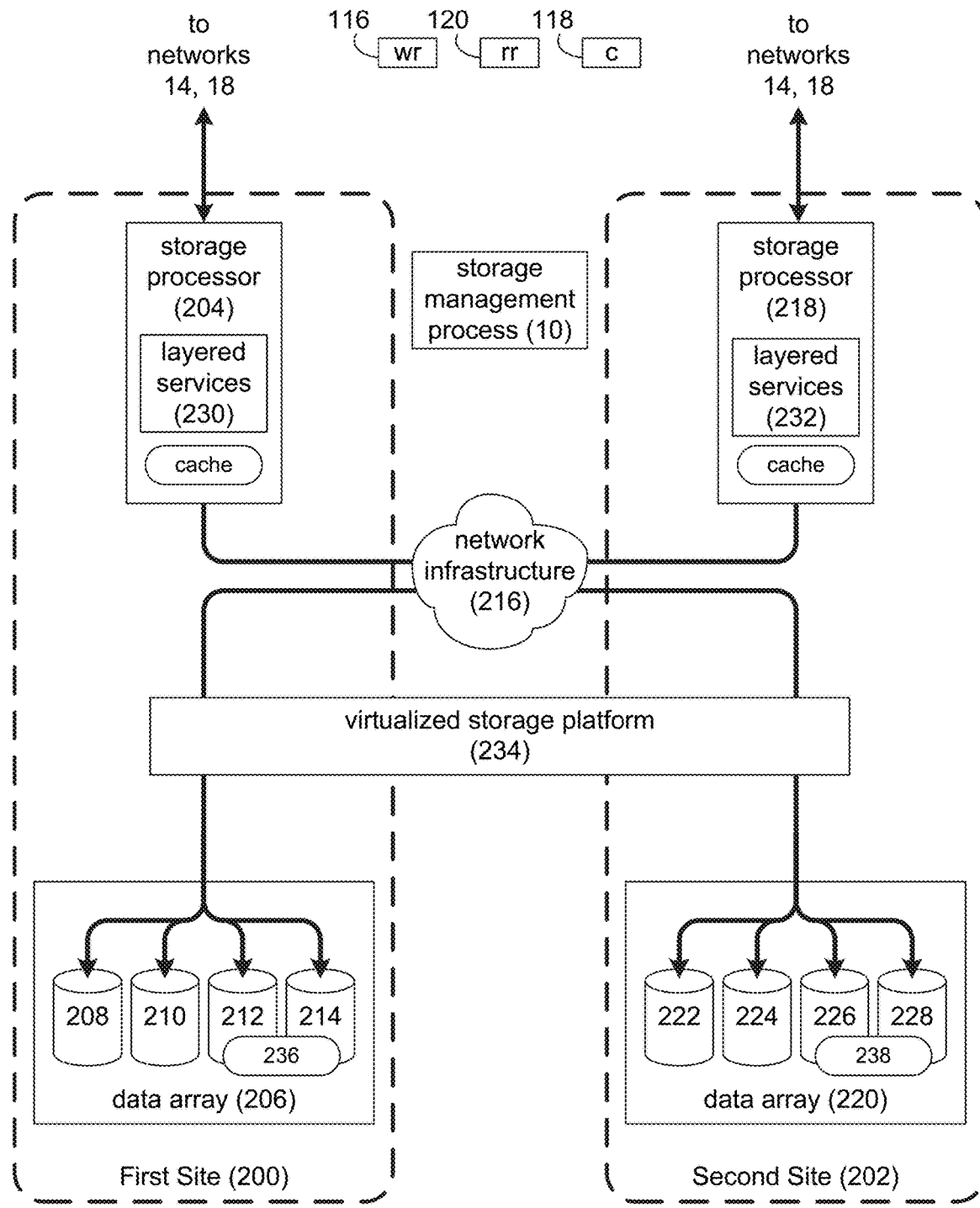
FIG. 3 is a diagrammatic view of another embodiment of the storage system of FIG. 1.

Referring also to FIG. 3, there is shown another implementation of storage system 12, which is shown in an active-active configuration. In this particular configuration, storage system 12 is shown to include two sites, namely first site 200 and second site 202. When configured in an active-active configuration, either site (e.g., first site 200 or second site 202) may be configured to process read requests and write requests in a manner so that any data stored within first site 200 and second site 202 is identical.

As discussed above, various IO requests (e.g. data write requests 116 and/or data read requests 120) may be generated. For example, these IO requests (e.g. data write requests 116 and/or data read requests 120) may be sent from client applications 22, 24, 26, 28 to storage system 12. Additionally/alternatively and when configured as an application server, IO requests (e.g. data write requests 116 and/or data read requests 120) may be internally generated within e.g., a storage processor within storage system 12.

As discussed above and in this particular embodiment, storage system 12 is shown to include first site 200 and second site 202. First site 200 is shown to include storage processor 204 and data array 206, wherein data array 206 is shown to include four storage targets (namely storage targets 208, 210, 212, 214). In this particular example, storage processor 204 is coupled to data array 206 via network infrastructure 216. Second site 202 is shown to include storage processor 218 and data array 220, wherein data array 220 is shown to include four storage targets (namely storage targets 222, 224, 226, 228). In this particular example, storage processor 218 is also coupled to data array 220 via network infrastructure 216.

While in the above-stated example, first site 200 and second site 202 are each shown to each include a separate and distinct data array (data array 206 and data array 220 respectively), this is for illustrative purposes only and is not intended to be a limitation of this disclosure, as other configurations are possible and are considered to be within the scope of this disclosure. For example, first site 200 and second site 202 may share a common data array and e.g., write their data to distinct LUNs (i.e., logical units) on the common data array.

While in the above-stated example, data array 206 and data array 220 are each shown to include four storage targets (storage targets 208, 210, 212, 214 and storage targets 222, 224, 226, 228 respectively), this is for illustrative purposes only and is not intended to be a limitation of this disclosure, as other configurations are possible and are considered to be within the scope of this disclosure. For example, the number of storage targets included within data array 206 and/or data array 220 may be increased or decreased depending upon need.

During operation, various clients (e.g., client applications 22, 24, 26, 28) may read data from and/or write data to either or both of first site 200 and second site 202, wherein active-active storage system 12 may be configured to ensure that the data within data array 206 and data array 220 are maintained in identical states. In order to achieve this, IO requests provided to (or generated by) storage system 12 may be intercepted and mirrored between first site 200 and second site 202.

Accordingly and when maintaining the active-active relationship between first site 200 and second site 202 within storage system 12, storage management process 10 may mirror a request (e.g. data write request 116 and/or data read request 120) received on first site 200 to second site 202 and may process the request (e.g. data write request 116 and/or data read request 120) received on first site 200 on both first site 200 and second site 202.

Conversely and when maintaining the active-active relationship between first site 200 and second site 202 within storage system 12, storage management process 10 may mirror a request (e.g. data write request 116 and/or data read request 120) received on second site 202 to first site 200; and may process the request (e.g. data write request 116 and/or data read request 120) received on second site 202 on both first site 200 and second site 202.

For example, if data write request 116 (concerning the writing of content 118) is received by first site 200, data write request 116 may be mirrored to second site 202 so that both first site 200 and second site 202 may process data write request 116 and, therefore, write content 118 to data array 206 and data array 220 (respectively).

Concerning read request 120, since the data stored within data array 206 and data array 220 is identical (for the reasons discussed above), either of first site 200 and second site 202 may process data read request 120. Accordingly, the mirroring of data read requests may not be needed/required. However, a higher level of performance may be realized by mirroring data read requests between first site 200 and second site 202. Specifically, by mirroring data read requests between first site 200 and second site 202 and having both of sites 200, 202 process data read request 120, the faster of sites 200, 202 will always provide the requested data first, thus ensuring a higher level of performance, wherein the data provided by the later-responding site could simply be ignored.

First site 200 and second site 202 may both be configured to include layered services module (e.g., layered services module 230, 232 respectively), wherein layered services module 230, 232 may be configured to dynamically process IO requests received by first site 200 and/or second site 202. Layered services module 230, 232 may be included within storage processors 204, 218 (respectively). For the following discussion, the operation of layered services module 230 will be discussed. However, it is understood that the following discussion may equally pertain to layered services module 232.

The storage included within data array 206 and/or data array 220 may be virtualized to expose various storage objects to e.g., users 46, 48, 50, 52. Accordingly, storage system 12 may include a virtualized storage platform (e.g., virtualized storage platform 234). For example and in order to ensure that first site 200 and second site 202 may operate in an active-active fashion, virtualized storage platform 234 may expose a LUN (i.e., logical unit) to each of first site 200 and second site 202.

As is known in the art, a LUN is a representation of a storage area that is not tied to any physical storage space, wherein LUNs may be thickly provisioned or may be thinly provisioned. When thickly provisioned, a LUN that has a specific capacity may always reserve storage space equal to the specific capacity (regardless of the actual quantity of storage currently being utilized by the thickly-provisioned LUN). And when thinly provisioned, a LUN that has a specific capacity may only reserve storage space equal to currently utilized storage (regardless of the specific capacity of the thinly-provisioned LUN).

Continuing with the above-stated example, LUN 236 may be exposed as a storage object within first site 200 and LUN 238 may be exposed as a storage object within second site 202. Accordingly and in order to ensure the proper processing of write requests (e.g., write request 116), write requests received by either of first site 200 or second site 202 may result in the content associated with the write request being written to both of LUN 236 and LUN 238. Additionally and in order to ensure the proper processing of read requests (e.g., read request 120), the most current version of the content requested by the read request may be maintained on both of LUN 236 and LUN 238 (thus allowing either of LUNs 236, 238 to satisfy read request 120).

Figure 4:
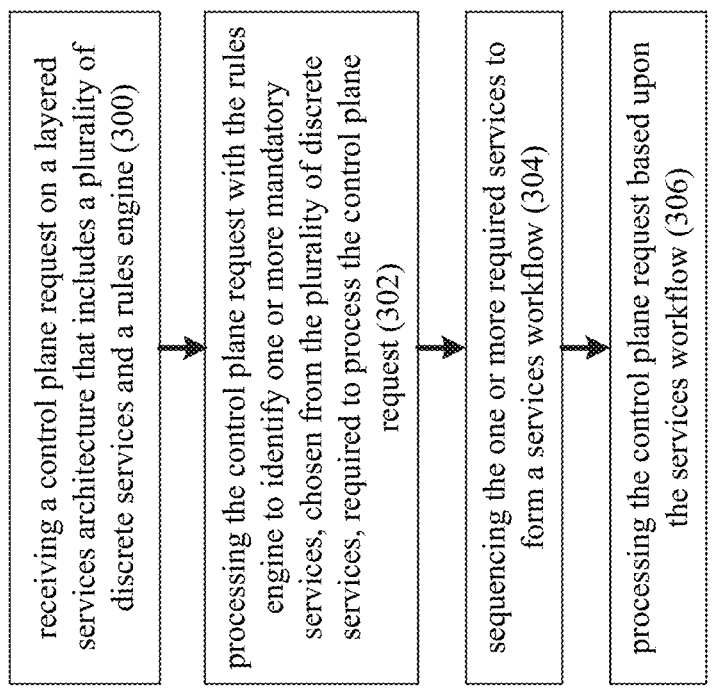
FIG. 4 is a flow chart of the storage management process of FIG. 1.
Figure 5:
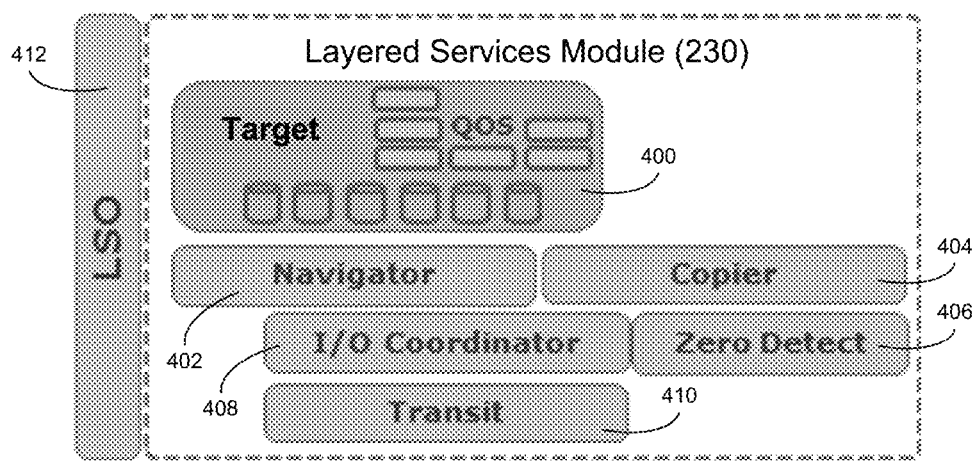
FIG. 5 is a diagrammatic view of a layered services module.

The Storage Management Process:

Referring also to FIGS. 4-5, storage management process 10 may receive 300 a control plane request (e.g., a control plane request for effectuating write request 116) on a layered services architecture (e.g., layered services module 230) that includes a plurality of discrete services (e.g., services 400, 402, 404, 406, 408, 410) and a layered services orchestrator (e.g., layer services orchestrator 412).

Concerning the services (e.g., services 400, 402, 404, 406, 408, 410) that are included within layered services module 230, these service may be the "building blocks" that may be dynamically arranged and sequenced so that the various control plane requests received by storage system 12 may be efficiently processed. Examples of such services (e.g., services 400, 402, 404, 406, 408, 410) may include but are not limited to:

IO target service 400 that may be configured to receive the control plane request to be processed;

navigator service 402 that may be configured to direct the control plane request to a plurality of storage objects (e.g., LUN 236 and LUN 238);

copier service 404 that may be configured to make a copy of data for a storage object (e.g., LUN 238);

zero detect service 406 that may be configured to detect the absence of data within a storage object being copied;

IO coordinator service 408 that may be configured to arbitrate IO conflicts when processing the control plane request; and transit service 410 that may be configured to provide data to (or receive data from) a remote storage object (e.g., LUN 238).

Figure 6:
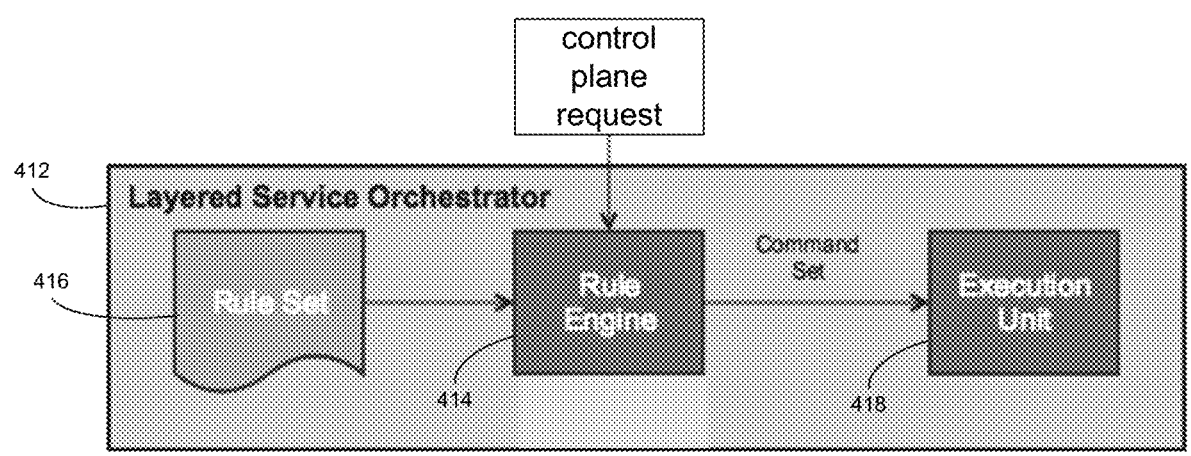
FIG. 6 is a diagrammatic view of a layered service orchestrator included within the layered services module of FIG. 5.

Referring also to FIG. 6, layered services orchestrator 412 may be configured to receive the control plane request, process the same, and generate the above-referenced services workflow. Specifically, layered services orchestrator 412 may include rules engine 414 that processes the received control plane request (e.g., write request 116) based upon rule set 416, wherein instructions are provided to execution unit 418 so that services 400, 402, 404, 406, 408, 410 may be arranged to form the above-referenced services workflow.

Accordingly, storage management process 10 may process 302 the control plane request with the rules engine (e.g., rules engine 414) to identify one or more mandatory services, chosen from the plurality of discrete services (e.g., services 400, 402, 404, 406, 408, 410, 412), that are required to process the control plane request. Storage management process 10 may then sequence 304 the one or more mandatory services to form a services workflow, wherein storage management process 10 may then process 306 the control plane request based upon the services workflow.

Specific Workflow Examples:

While the following discussion concerns four exemplary services workflows that may be generated by storage management process 10, this is for illustrative purposes only and is not intended to be a limitation of this disclosure, as other configurations are possible. As discussed above, storage management process 10 may process 302 the control plane request with the rules engine (e.g., rules engine 414) to identify one or more mandatory services that are required to process the control plane request, wherein these mandatory services may then be sequenced 304 to form a services workflow. Therefore, different control plane requests that are processed 302 by storage management process 10 may result in different services workflows.

Figure 7:
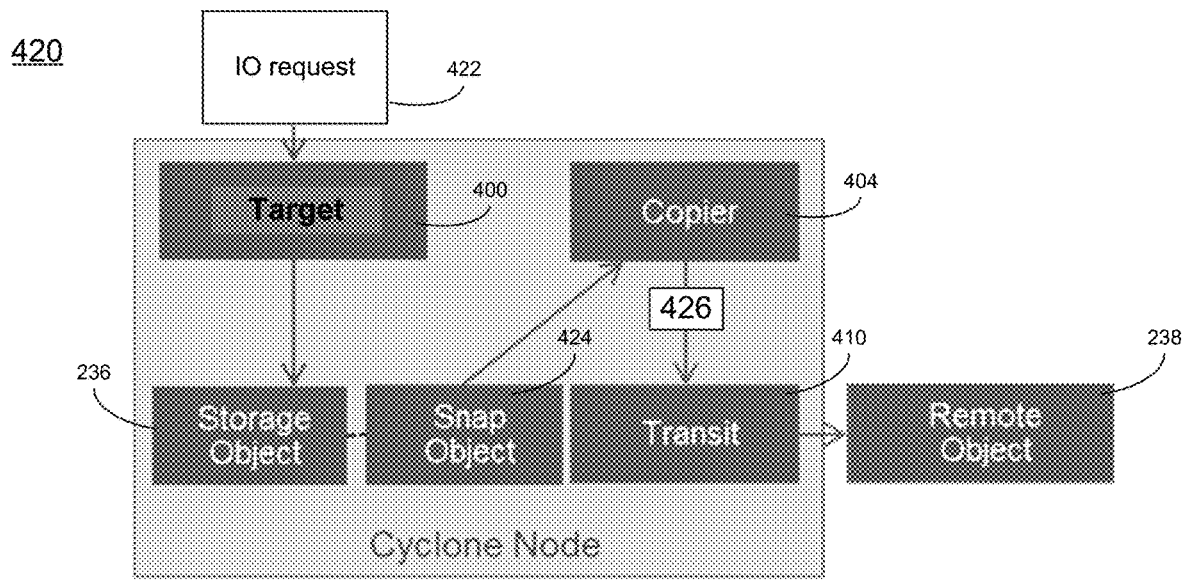
FIG. 7 is a diagrammatic view of one services workflow generated by the layered services module of FIG. 5.

Referring also to FIG. 7, there is shown one example of a services workflow (e.g., Asynchronous Copy Mode (Push) services workflow 420). Assume for this illustrative example that the IO request (e.g., IO request 422) received 300 concerns the asynchronous copying of a storage object (e.g., LUN 236) to generate a remote object (e.g., LUN 238). Storage management process 10 may process 302 IO request 422 with rules engine 414 to identify three mandatory services (chosen from services 400, 402, 404, 406, 408, 410, 412) that are required to process IO request 422.

For this example and with respect to these three mandatory services, IO target service 400 may receive IO request 422, wherein storage management process 10 may take a snapshot (e.g., snap object 424) of the contents of the storage object to be copied (e.g., LUN 236). As is known in the art, a snapshot is one or more files that are indicative of the content of a storage object at the time that the snapshot was created. Copier service 404 may then use snap object 424 to create copy 426 of the data included within the storage object being copied (e.g., LUN 236), wherein copy 426 may be provided to transit service 410 that may be configured to provide copy 426 to the remote object (e.g., LUN 238).

Accordingly, storage management process 10 has sequenced 304 the mandatory services to form services workflow 420, wherein storage management process 10 may then process 306 IO request 422 based upon services workflow 420.

Figure 8:
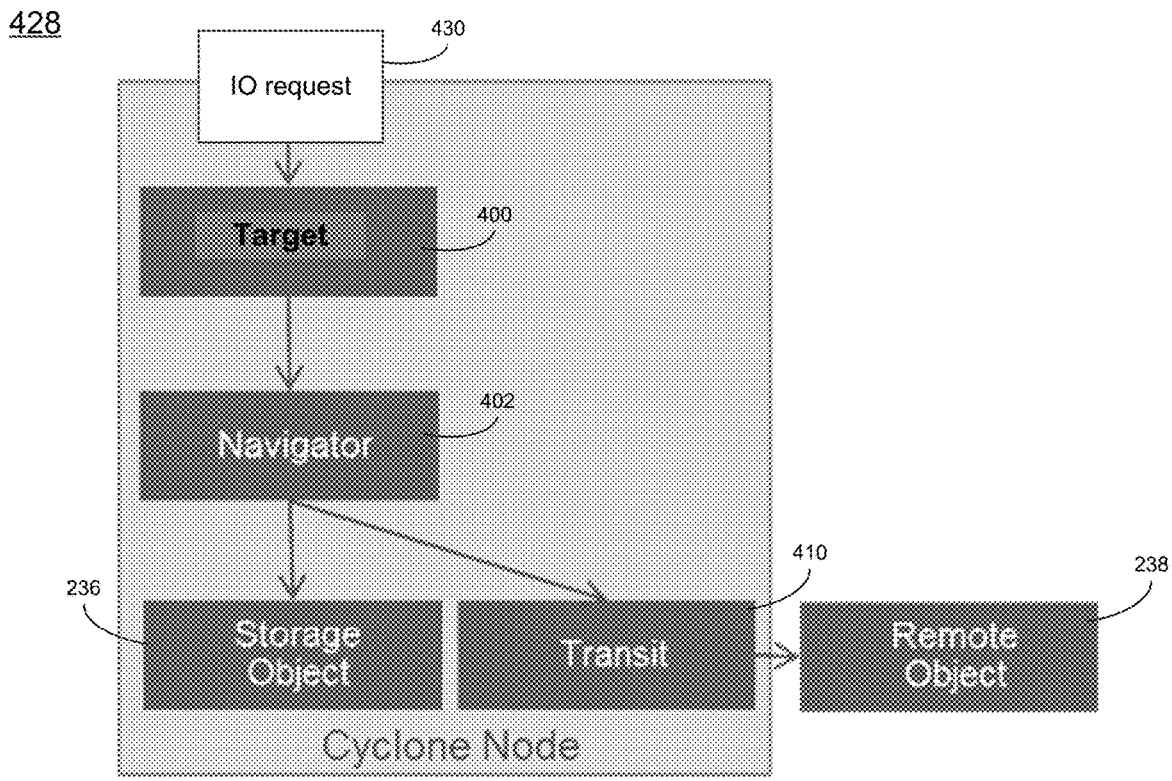
FIG. 8 is a diagrammatic view of another services workflow generated by the layered services module of FIG. 5.

Referring also to FIG. 8, there is shown another example of a services workflow (e.g., Synchronous Copy Mode (Push) services workflow 428). Assume for this illustrative example that the IO request (e.g., IO request 430) received 300 concerns the synchronous copying of a storage object (e.g., LUN 236) to generate a remote object (e.g., LUN 238). Storage management process 10 may process 302 IO request 430 with rules engine 414 to identify three mandatory services (chosen from services 400, 402, 404, 406, 408, 410, 412) that are required to process IO request 430.

For this example and with respect to these three mandatory services, IO target service 400 may receive IO request 430. Navigator service 402 may direct IO request 430 to both the storage object (e.g., LUN 236) and the remote object (e.g., LUN 238). Specifically, navigator service 402 may direct IO request 430 to the storage object (e.g., LUN 236) and to transit service 410 that may be configured to provide IO request 430 to the remote object (e.g., LUN 238).

Accordingly, storage management process 10 has sequenced 304 the mandatory services to form services workflow 428, wherein storage management process 10 may then process 306 IO request 430 based upon services workflow 428.

Figure 9:
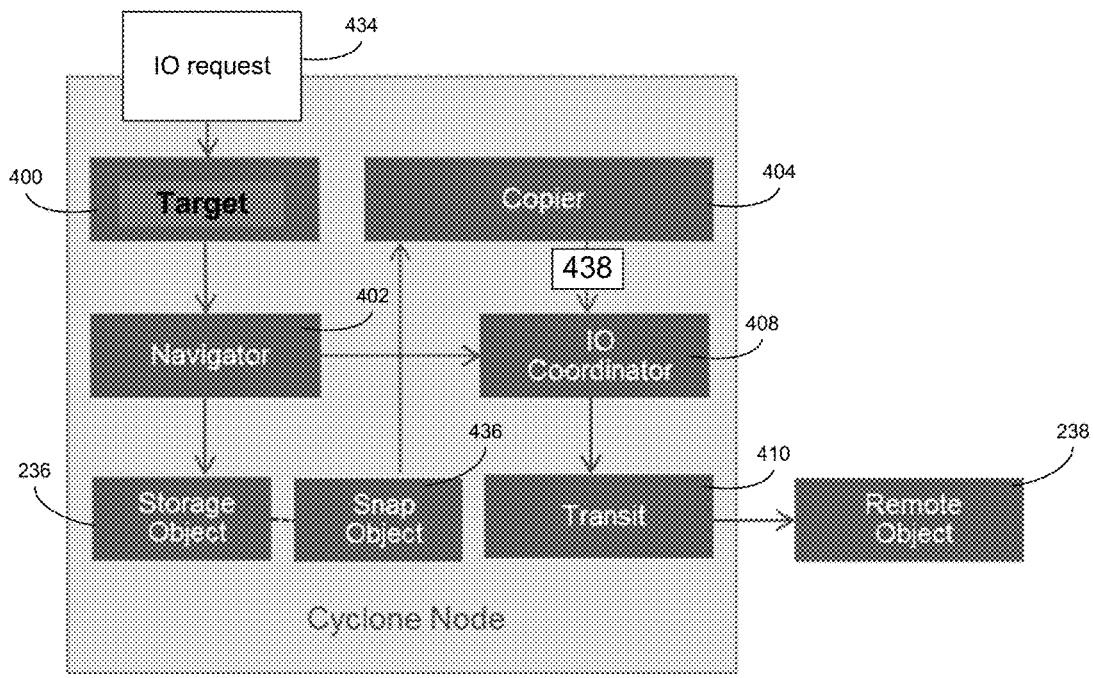
FIG. 9 is a diagrammatic view of another services workflow generated by the layered services module of FIG. 5.

Referring also to FIG. 9, there is shown another example of a services workflow (e.g., Coordinated Copy Mode (Push) services workflow 432). Assume for this illustrative example that the IO request (e.g., IO request 434) received 300 concerns the asynchronous copying and the synchronous copying of a storage object (e.g., LUN 236) to generate a remote object (e.g., LUN 238). Storage management process 10 may process 302 IO request 434 with rules engine 414 to identify five mandatory services (chosen from services 400, 402, 404, 406, 408, 410, 412) that are required to process IO request 434.

For this example and with respect to these five mandatory services, IO target service 400 may receive IO request 434, wherein IO request 434 may be provided to navigator service 402. Navigator service 402 may direct IO request 434 to both the storage object (e.g., LUN 236) and the remote object (e.g., LUN 238). Specifically, navigator service 402 may direct IO request 434 to the storage object (e.g., LUN 236) and to IO coordinator service 408. Storage management process 10 may take a snapshot (e.g., snap object 436) of the contents of the storage object to be copied (e.g., LUN 236). Copier service 404 may then use snap object 436 to generate copy 438 of the data included within the storage object being copied (e.g., LUN 236), wherein copy 438 may also be provided to IO coordinator service 408.

IO coordinator service 408 may be configured to arbitrate IO conflicts when processing IO request 434. Accordingly, if a particular memory space (e.g., an LBA) within the remote object (e.g., LUN 238) is being written twice (once via the asynchronous copy operation and once via the synchronous copy operation), IO coordinator service 408 may determine whether to process one, the other, or both of these operations. For example, the asynchronous copy function copies old data (the data that was present on the storage object (e.g., LUN 236) to the remote object (e.g., LUN 238), where the synchronous copy function copies new data that is received after the initiation of the copy command. Accordingly, if the first write operation to a particular memory space within the remote object (e.g., LUN 238) is an asynchronous write operation and the second write operation to the same memory space within the remote object (e.g., LUN 238) is a synchronous write operation, both write operations will be processed, as the newer data will overwrite the older data. However, if the first write operation to a particular memory space within the remote object (e.g., LUN 238) is a synchronous write operation and the second write operation to the same memory space within the remote object (e.g., LUN 238) is an asynchronous write operation, the second write operations will be blocked, as the older data should not overwrite the newer data. IO coordinator service 408 may provide the appropriate IO requests to transit service 410 that may be configured to provide the IO request to the remote object (e.g., LUN 238).

Accordingly, storage management process 10 has sequenced 304 the mandatory services to form services workflow 432, wherein storage management process 10 may then process 306 IO request 434 based upon services workflow 432.

Figure 10:
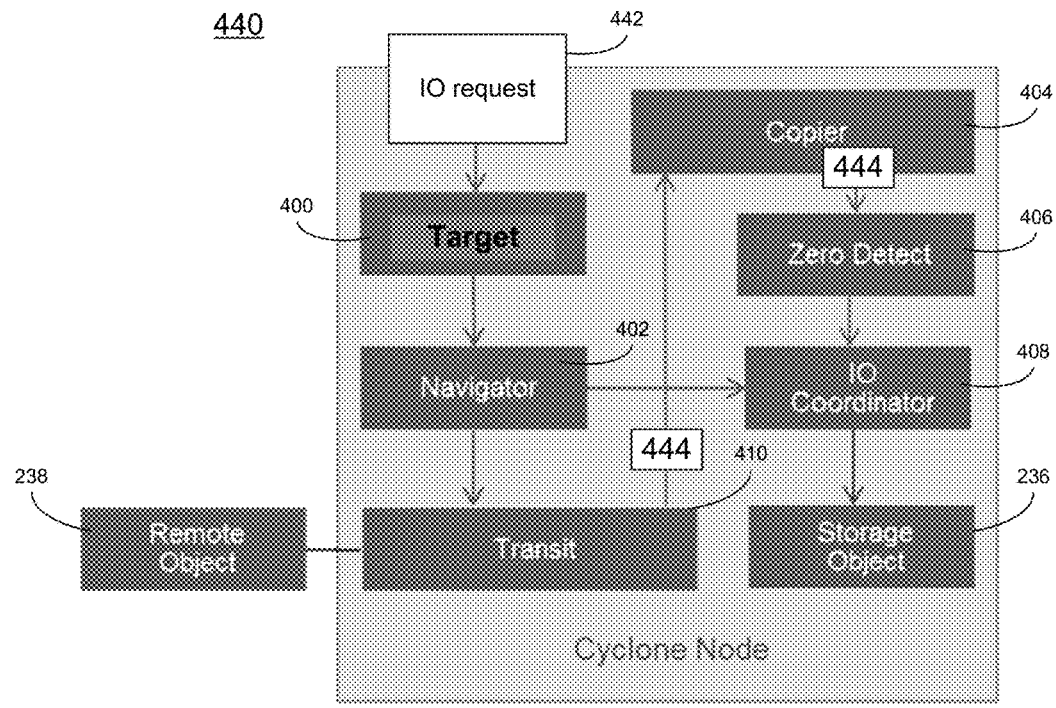
FIG. 10 is a diagrammatic view of another services workflow generated by the layered services module of FIG. 5.

Referring also to FIG. 10, there is shown another example of a services workflow (e.g., Coordinated Copy Mode (Pull) services workflow 440). Assume for this illustrative example that the IO request (e.g., IO request 442) received 300 concerns the asynchronous copying and the synchronous copying of a remote object (e.g., LUN 238) to generate a storage object (e.g., LUN 236). Storage management process 10 may process 302 IO request 442 with rules engine 414 to identify six mandatory services (chosen from services 400, 402, 404, 406, 408, 410, 412) that are required to process IO request 442.

For this example and with respect to these six mandatory services, IO target service 400 may receive IO request 442, wherein IO request 442 may be provided to navigator service 402. Navigator service 402 may direct IO request 442 to both the storage object (e.g., LUN 236) and the remote object (e.g., LUN 238). Specifically, navigator service 402 may direct IO request 442 to transit service 410 and to IO coordinator service 408. Transit service 410 may read the data stored on the remote object (e.g., LUN 238) and provide the same to copier 404. Copier 404 may make a copy of the data stored on the remote object (e.g., LUN 238) and may provide copy 444 to zero detect service 406 that may be configured to detect the absence of data within copy 444. For example, if the remote object (e.g., LUN 238) was thickly provisioned, a portion of the content of LUN 238 may be padding (e.g., zeros) that fill out the unused portion of LUN 238. Accordingly, zero detect service 406 may be configured to remove such padding prior to writing the data to the storage object (e.g., LUN 236). The output of zero detect service 406 may also be provided to IO coordinator service 408.

As discussed above, IO coordinator service 408 may be configured to arbitrate IO conflicts when processing IO request 442. Accordingly, if a particular memory space (e.g., an LBA) within the storage object (e.g., LUN 238) is being written twice (once via the asynchronous copy operation and once via the synchronous copy operation), IO coordinator service 408 may determine whether to process one, the other, or both of these operations. For example, the asynchronous copy function copies old data (the data that was present on the remote object (e.g., LUN 238) to the storage object (e.g., LUN 236), where the synchronous copy function copies new data that is received after the initiation of the copy command. Accordingly, if the first write operation to a particular memory space within the storage object (e.g., LUN 236) is an asynchronous write operation and the second write operation to the same memory space within the storage object (e.g., LUN 236) is a synchronous write operation, both write operations will be processed, as the newer data will overwrite the older data. However, if the first write operation to a particular memory space within the storage object (e.g., LUN 236) is a synchronous write operation and the second write operation to the same memory space within the storage object (e.g., LUN 236) is an asynchronous write operation, the second write operations will be blocked, as the older data should not overwrite the newer data.

Accordingly, storage management process 10 has sequenced 304 the mandatory services to form services workflow 440, wherein storage management process 10 may then process 306 IO request 442 based upon services workflow 440.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a control plane request on a layered services architecture that includes a plurality of discrete services and a rules engine;
   processing the control plane request with the rules engine to identify one or more mandatory services, chosen from the plurality of discrete services, required to process the control plane request, wherein the plurality of discrete services includes:
      an IO coordinator service that is configured to arbitrate IO conflicts when processing the control plane request, wherein arbitrating IO conflicts includes:
         determining, via the IO coordinator service, whether to process at least one of an asynchronous copy operation, a synchronous copy operation, and both the asynchronous copy operation and synchronous copy operation when a memory space within a remote data object is written once via the asynchronous copy operation and once via the synchronous copy operation, wherein if a first write operation to the memory space within the remote data object is a synchronous write operation and a second write operation to the memory space within the remote data object is an asynchronous write operation, then the second write operation is blocked from overwriting newer data associated with the synchronous copy operation;
   sequencing the one or more mandatory services to form a services workflow; and
   processing the control plane request based upon the services workflow.

2. The computer-implemented method of claim 1 wherein the plurality of discrete services includes:
   a navigator service that is configured to direct the control plane request to a plurality of data targets.

3. The computer-implemented method of claim 1 wherein the plurality of discrete services includes:
   a transit service that is configured to provide data to a remote data target.

4. The computer-implemented method of claim 1 wherein the plurality of discrete services includes:
   a copier service that is configured to make a copy of data for a remote data target.

5. The computer-implemented method of claim 1 wherein the plurality of discrete services includes:
   a zero detect service that is configured to detect the absence of data within a data object being copied.

6. The computer-implemented method of claim 1 wherein the plurality of discrete services includes:
   an IO target service that is configured to receive the control plane request.

7. A computer program product residing on a computer readable medium having a plurality of instructions stored thereon which, when executed by a processor, cause the processor to perform operations comprising:
   receiving a control plane request on a layered services architecture that includes a plurality of discrete services and a rules engine;
   processing the control plane request with the rules engine to identify one or more mandatory services, chosen from the plurality of discrete services, required to process the control plane request, wherein the plurality of discrete services includes:
      an IO coordinator service that is configured to arbitrate IO conflicts when processing the control plane request, wherein arbitrating IO conflicts includes:
         determining, via the IO coordinator service, whether to process at least one of an asynchronous copy operation, a synchronous copy operation, and both the asynchronous copy operation and synchronous copy operation when a memory space within a remote data object is written once via the asynchronous copy operation and once via the synchronous copy operation, wherein if a first write operation to the memory space within the remote data object is a synchronous write operation and a second write operation to the memory space within the remote data object is an asynchronous write operation, then the second write operation is blocked from overwriting newer data associated with the synchronous copy operation;
   sequencing the one or more mandatory services to form a services workflow; and
   processing the control plane request based upon the services workflow.

8. The computer program product of claim 7 wherein the plurality of discrete services includes:
   a navigator service that is configured to direct the control plane request to a plurality of data targets.

9. The computer program product of claim 7 wherein the plurality of discrete services includes:
   a transit service that is configured to provide data to a remote data target.

10. The computer program product of claim 7 wherein the plurality of discrete services includes:
    a copier service that is configured to make a copy of data for a remote data target.

11. The computer program product of claim 7 wherein the plurality of discrete services includes:
    a zero detect service that is configured to detect the absence of data within a data object being copied.

12. The computer program product of claim 7 wherein the plurality of discrete services includes:
    an IO target service that is configured to receive the control plane request.

13. A computing system including a processor and memory configured to perform operations comprising:
    receiving a control plane request on a layered services architecture that includes a plurality of discrete services and a rules engine;
    processing the control plane request with the rules engine to identify one or more mandatory services, chosen from the plurality of discrete services, required to process the control plane request, wherein the plurality of discrete services includes:
       an IO coordinator service that is configured to arbitrate IO conflicts when processing the control plane request, wherein arbitrating IO conflicts includes:
          determining, via the IO coordinator service, whether to process at least one of an asynchronous copy operation, a synchronous copy operation, and both the asynchronous copy operation and synchronous copy operation when a memory space within a remote data object is written once via the asynchronous copy operation and once via the synchronous copy operation, wherein if a first write operation to the memory space within the remote data object is a synchronous write operation and a second write operation to the memory space within the remote data object is an asynchronous write operation, then the second write operation is blocked from overwriting newer data associated with the synchronous copy operation;
    sequencing the one or more mandatory services to form a services workflow; and
    processing the control plane request based upon the services workflow.

14. The computing system of claim 13 wherein the plurality of discrete services includes:
    a navigator service that is configured to direct the control plane request to a plurality of data targets.

15. The computing system of claim 13 wherein the plurality of discrete services includes:
    a transit service that is configured to provide data to a remote data target.

16. The computing system of claim 13 wherein the plurality of discrete services includes:
    a copier service that is configured to make a copy of data for a remote data target.

17. The computing system of claim 13 wherein the plurality of discrete services includes:
    a zero detect service that is configured to detect the absence of data within a data object being copied.

18. The computing system of claim 13 wherein the plurality of discrete services includes:
    an IO target service that is configured to receive the control plane request.

* * * * *